United States Patent
Nomura

(10) Patent No.: US 7,027,482 B1
(45) Date of Patent: Apr. 11, 2006

(54) TRANSMITTER WITH MEANS FOR COMPLEMENTARILY SCALING THE INPUT AND OUTPUT SIGNALS OF A D/A CONVERTER

(75) Inventor: Tominari Nomura, Tokyo (JP)

(73) Assignee: NEC Corporation, Tokyo (JP)

(*) Notice: Subject to any disclaimer, the term of this patent is extended or adjusted under 35 U.S.C. 154(b) by 1186 days.

(21) Appl. No.: 09/583,870

(22) Filed: May 31, 2000

(30) Foreign Application Priority Data

Jun. 2, 1999 (JP) .................................. 11-154853

(51) Int. Cl.
H04B 1/69 (2006.01)
H04J 13/02 (2006.01)

(52) U.S. Cl. ...................................... 375/130; 370/342
(58) Field of Classification Search ................ 375/298, 375/130, 135, 146; 370/130, 342; 455/69, 455/522
See application file for complete search history.

(56) References Cited

U.S. PATENT DOCUMENTS

| 5,708,681 | A | | 1/1998 | Malkemes et al. |
| 5,715,526 | A | * | 2/1998 | Weaver et al. ............... 455/126 |
| 5,751,705 | A | * | 5/1998 | Sato ........................... 370/335 |
| 6,166,601 | A | * | 12/2000 | Shalom et al. .............. 330/151 |
| 6,266,320 | B1 | * | 7/2001 | Hedberg et al. ............ 370/206 |
| 6,272,125 | B1 | * | 8/2001 | Nomura ...................... 370/342 |
| 6,286,994 | B1 | * | 9/2001 | Boesel et al. ............... 374/146 |
| 6,463,296 | B1 | * | 10/2002 | Esmailzadeh et al. ...... 455/522 |
| 6,553,018 | B1 | * | 4/2003 | Ichihara ...................... 370/342 |
| 6,628,732 | B1 | * | 9/2003 | Takaki ......................... 375/345 |
| 6,636,555 | B1 | * | 10/2003 | Frank et al. ................. 375/146 |
| 6,741,867 | B1 | * | 5/2004 | Tetsuya ...................... 455/522 |
| 2001/0014612 | A1 | * | 8/2001 | Uesugi ........................ 455/522 |

FOREIGN PATENT DOCUMENTS

| EP | 0 681 382 A2 | 11/1995 |
| EP | 0 887 925 A2 | 12/1998 |
| EP | 0 944 182 A2 | 9/1999 |
| JP | 3-44115 A | 2/1991 |
| JP | 11-27233 A | 1/1999 |

* cited by examiner

*Primary Examiner*—Emmanuel Bayard
*Assistant Examiner*—Lawrence B. Williams
(74) *Attorney, Agent, or Firm*—Sughrue Mion, PLLC

(57) ABSTRACT

In a spread spectrum transmitter, a number of spread spectrum channel signals are multiplexed into a digital amplitude signal by a multiplexer, and the time-average power of the digital amplitude signal is determined by an average calculator. The digital amplitude signal is interpolated by an interpolator, scaled according to a first scale factor by a bit shifter and converted to an analog amplitude signal by a D/A converter. The analog amplitude signal is then scaled according to a second scale factor in a gain controlled amplifier. The first and second scale factors are complementarily varied by a control circuit according to the output of the average calculator so that the carrier-to-noise ratio of the transmitter is maintained substantially constant regardless of the varying power level of the multiplexed signals.

17 Claims, 4 Drawing Sheets

TRANSMITTER WITH MEANS FOR COMPLEMENTARILY SCALING THE INPUT AND OUTPUT SIGNALS OF A D/A CONVERTER

BACKGROUND OF THE INVENTION

1. Field of the Invention

The present invention relates generally to transmission systems and more specifically to a technique for improving the carrier-to-noise ratio (CNR) of radio transmissions. The present invention is particularly suitable for improving the CNR value of a code division multiple access (CDMA) transmitters such as cell-site base transmitters.

2. Description of the Related Art

In cell-site CDMA transmitters of a cellular mobile communication network, individual spread spectrum channel signals are synchronised and multiplexed (or digitally summed) into digital amplitude data. This amplitude data is converted by a digital-to-analog converter to an analog amplitude signal, which is up-converted, power-amplified and then transmitted. In order to prevent the digital-to-analog converter from being overloaded, the maximum amplitude of each transmit channel signal is determined in advance so that the total amplitude of the multiplexed signals corresponds to the upper limit of the digital-to-analog converter. However, the performance of the transmission system is determined by the CNR requirement of the largest signal level to be power amplified prior to modulation onto a radio frequency carrier. As a result, when not all individual channels are multiplexed during low traffic periods, the carrier-to-noise ratio of the system becomes lower than the required value.

One approach to this problem is to use a digital-to-analog converter for each channel signal to produce a multiplex of analog amplitude signals, instead of using the single digital-to-analog converter for producing a multiplex of digital amplitude signals. However, this approach is not an economical implementation and requires additional circuitry that ensures orthogonality between any pair of analog spread spectrum channel signals.

SUMMARY OF THE INVENTION

It is therefore an object of the present invention to provide a transmitter and a communication method for improving the carrier-to-noise ratio of a signal that has been subjected to a digital-to-analog conversion process prior to transmission.

According to a first aspect of the present invention, there is provided a transmitter comprising average power level calculation circuitry for determining the time-average power of a digital amplitude signal, and conversion circuitry for scaling the digital amplitude signal according to a first scale factor, converting the scaled digital amplitude signal to an analog amplitude signal, scaling the analog amplitude signal according to a second scale factor, and control circuitry for complementarily varying the first and second scale factors according to the time-average power.

According to a second aspect, the present invention provides a spread spectrum transmitter comprising a multiplexer for multiplexing a plurality of spread spectrum channel signals to produce a digital amplitude signal, average power level calculation circuitry for determining the time-average power of the digital amplitude signal, and conversion circuitry for scaling the digital amplitude signal according to a first scale factor, converting the scaled digital amplitude signal to an analog amplitude signal, scaling the analog amplitude signal according to a second scale factor, and control circuitry for complementarily varying the first and second scale factors according to the time-average power.

According to a third aspect of the present invention, there is provided a communication method comprising the steps of determining the time-average power of a digital amplitude signal, scaling the digital amplitude signal according to the time-average power, converting the scaled digital amplitude signal to an analog amplitude signal, scaling the analog amplitude signal according to the time-average power complementarily to the scaling of the digital amplitude signal and transmitting the scaled analog amplitude signal.

BRIEF DESCRIPTION OF THE DRAWINGS

The present invention will be described in further detail with reference to the accompanying drawings, in which.

DETAILED DESCRIPTION

Figure 1:
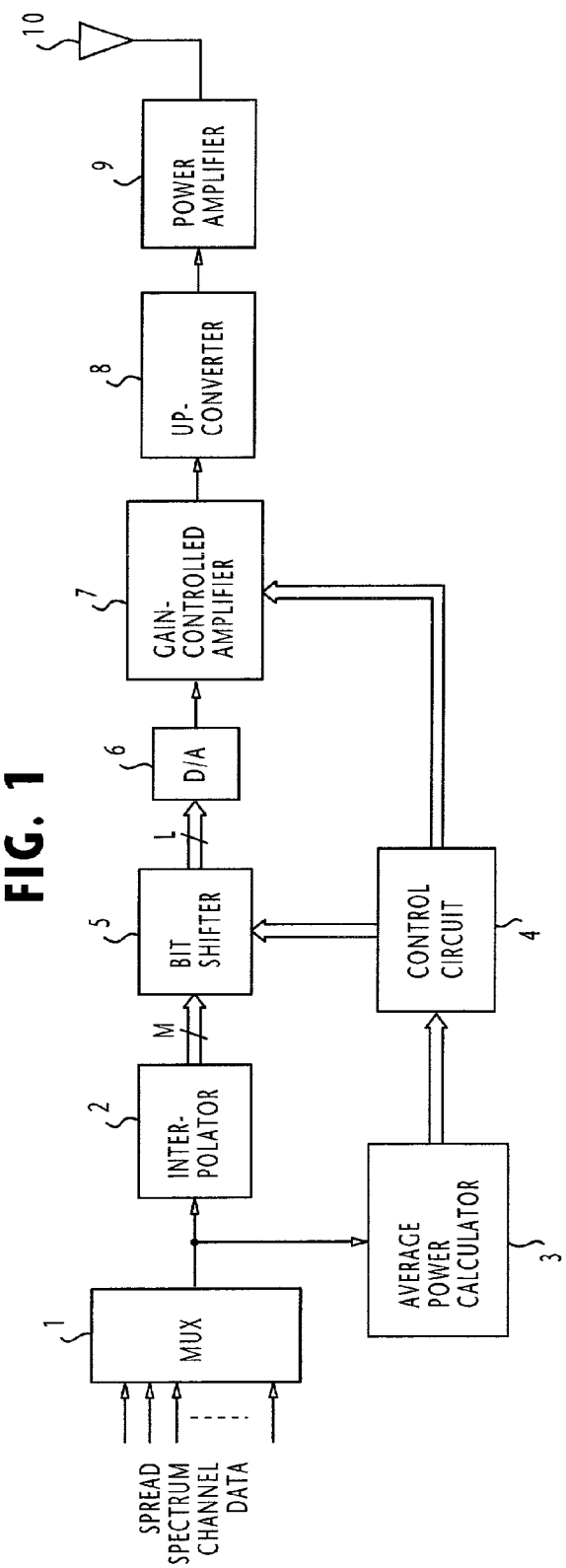
FIG. 1 is a block diagram of a CDMA transmitter according to a first embodiment of the present invention.

Referring now to FIG. 1, there is shown a CDMA (code division multiple access) transmission circuit according to a first embodiment of the present invention for a communication system such as a cell-site base station of a cellular mobile communication network. It is seen in FIG. 1 that a plurality of individual digital spread spectrum channel signals (either speech or data) are multiplexed (or "digitally summed") in a multiplexer 1 into digital amplitude data. Each of the input spread spectrum signals is a signal that has been spread (scrambled) with short and long spreading codes and time-synchronized with other spread spectrum signals in a manner well known in the CDMA art.

According to this invention, the digital amplitude data from the multiplexer 1 is supplied to an interpolator 2 and an average power calculator 3 simultaneously. Average power calculator 3 calculates a time-average value of the total power level of the multiplexed amplitude data and feeds a control circuit 4.

Figure 2:
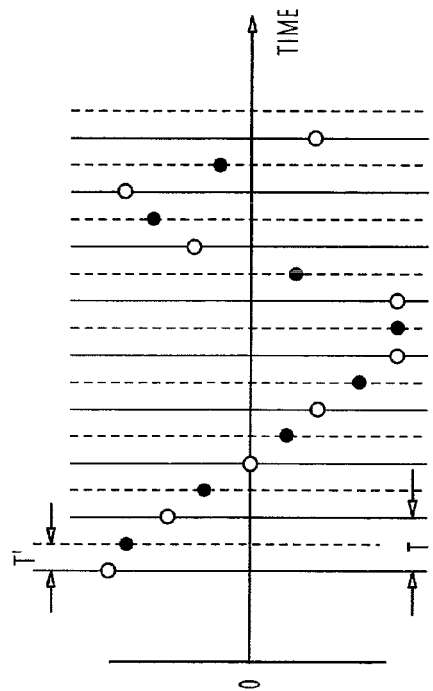
FIG. 2 is a timing diagram for illustrating an interpolated bit sequence.

Interpolator 2 provides interpolation on N bits of the amplitude data and produces M bits of multiplexed amplitude data, where M is greater than N. For example, if the N-bit multiplexed amplitude data has a sequence of bits $\{A_1, A_2, \ldots, A_N\}$ occurring at T-intervals, as indicated by circles in FIG. 2, the interpolator 2 calculates the amplitude difference between successive bits and determines the gradient of a slope as $(A_i+A_{i+1})/T$ (where i=1, 2, ... N) during each bit interval T. If one bit is interpolated between successive input bits as indicated by dots in FIG. 2, the interpolator 2 produces an M-bit output sequence in which the individual bits occur at interval T' equal to T/2.

Figure 3:
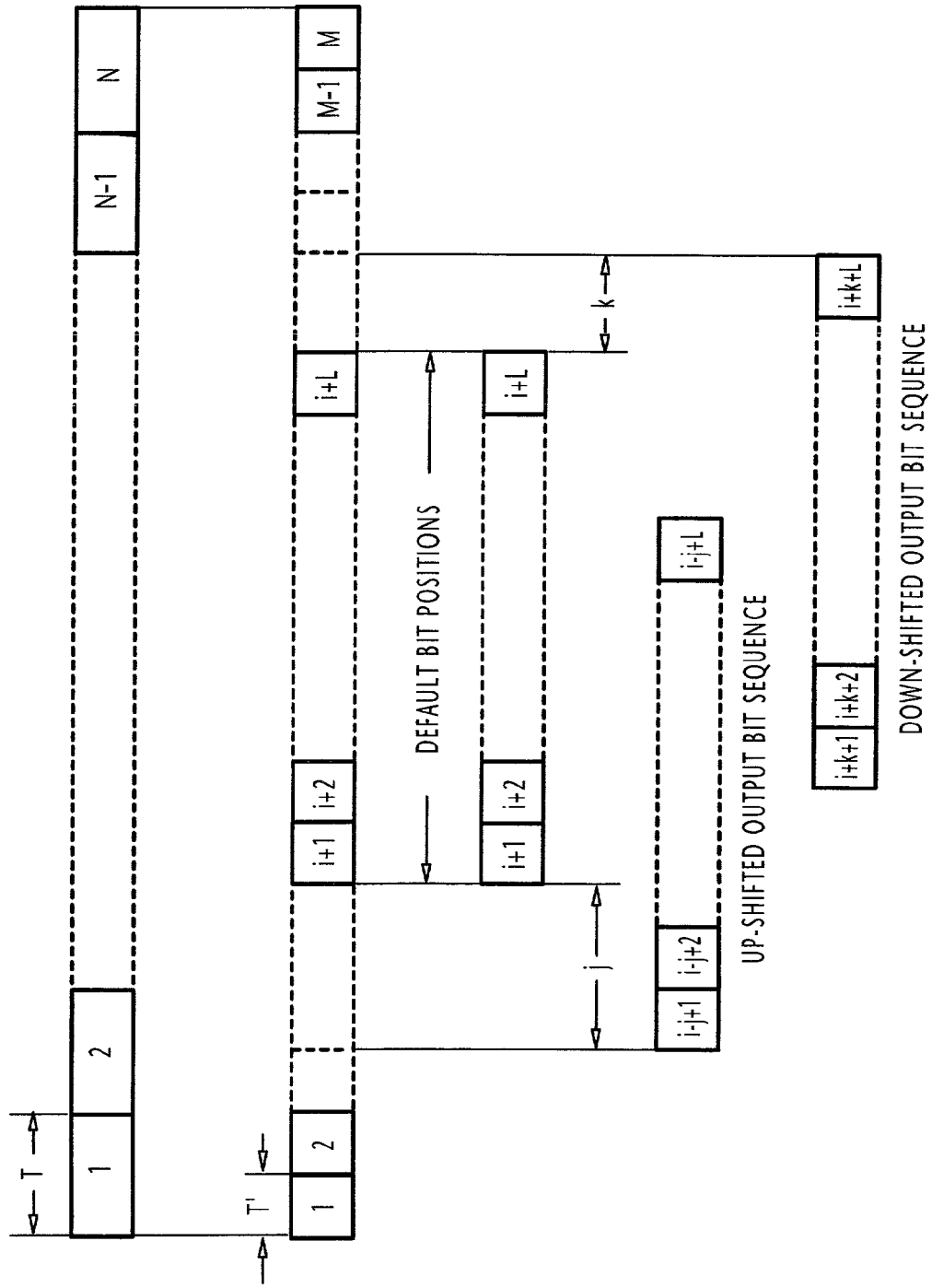
FIG. 3 shows relationships between an N-bit sequence, an interpolated M-bit bit sequence and a selected L-bit sequence.

The output of the interpolator 2 is sent to a bit shifter 5. Bit shifter selects a sequence of a predetermined number of "L" bits from bit positions of each input M-bit sequence which are specified by the control circuit 4, where the integer L is larger than N but smaller than M. As shown in FIG. 3, the bit shifter 5 may be implemented with an M-stage shift register in which default bit positions (i+1) to (i+L) are defined. According to the average power of the multiplexed amplitude data relative to a reference power level, the control circuit 4 determines the scale factor of the input signal to the D/A converter 6 and determines the bit positions of an output L-bit sequence within an input M-bit sequence. Control circuit 4 specifies the bit positions of the output L-bit sequence and instructs the bit shifter 5 to select an L-bit sequence from the specified bit positions of the M-bit sequence.

The L-bit sequence selected by the bit shifter 5 is converted to a corresponding analog amplitude signal by a digital-to-analog converter 6. A gain-controlled amplifier 7 is connected to the output of D/A converter 6 for amplifying the analog amplitude signal according to a scale factor specified by the control circuit 4. The output of the gain-controlled amplifier 7 is modulated onto a radio frequency carrier in an up-converter 8. The modulated carrier is power-amplified by a transmission power amplifier stage 9 and transmitted from an antenna 10.

In order to meet the carrier-to-noise ratio requirement of the transmitter at all levels of transmissions, the bit shifting of shifter 5 and the gain of amplifier 7 are complementarily controlled by the control circuit 4 in a compression-expansion mode or in an expansion-compression mode depending on the average power of the amplitude data relative to a reference power level as follows.

Control circuit 4 determines whether the calculated average power level is higher or lower than a reference (default) value which may be a maximum average power level, a minimum average power level or an intermediate value that lies anywhere between the maximum and minimum values. Assume that an intermediate value is used as the reference value. In this case, the gain-controlled amplifier 7 is initialized so that, when the average power level of the output of the multiplexer 1 is equal to the reference value, the carrier-to-noise ratio of the transmitter is controlled at the required value.

If the control circuit determines that the calculated average power is lower than the intermediate reference value, it produces a down-shift control signal that causes the bit shifter 5 to select from an interpolated M-bit sequence an L-bit sequence {(i+k+1) through (i+k+L)} that is shifted downwards by "k" bits with respect to the default bit positions as illustrated in FIG. 3, where the integer "k" represents the difference between the calculated average power and the intermediate reference power level. Then, the control circuit 4 proceeds to increment the gain of the amplifier 7 by an integral multiple of 6 dB, i.e., 6 dB times the integer "k". Since the k-bit downward-shifted L-bit sequence is $2^k$ times smaller than an L-bit sequence which would be selected from the default bit positions when the calculated average power were equal to the intermediate reference value, the complementary increment of the amplifier gain by a factor $2^k$ controls the CNR value of the current lower-than-reference signal at the same value which would be obtained when the average power of the input signals is equal to the reference value.

If the control circuit determines that the calculated average power is higher than the intermediate reference value, it produces a down-shift control signal that causes the bit shifter 5 to select from an interpolated M-bit sequence an L-bit sequence {(i−j+1) through (i−j+L)} that is shifted upwards by "j" bits with respect to the default bit positions as illustrated in FIG. 3, where the integer "j" represents the difference between the calculated average power and the intermediate reference value. Control circuit 4 proceeds to control the amplifier 7 by decrementing its gain by an integral multiple of 6 dB, i.e., 6 dB times the integer "j". Since the j-bit upward-shifted L-bit sequence is $2^j$ times greater then the L-bit sequence which would be selected from the default bit positions, the complementary decrement of the amplifier gain by a factor $2^j$ controls the CNR value of the current higher-than-reference signal at the same value which would be obtained when the average power of the input signals is equal to the reference value.

If the calculated average power of the multiplexed data is equal to the intermediate reference value corresponding to the default bit-positions and designated as $S_R/n$, where n is the background noise.

When the calculated average power of multiplexed amplitude data is ½ of the reference level and designated as $S_L$, the bit shifter 5 selects an L-bit sequence from positions one bit downward-shifted with respect to the default positions. This one-bit downward shift causes the input signal of the D/A converter 6 to be scaled up by a factor 2. Complementary to the operation of bit shifter 5, the output of the D/A converter 6 is then scaled down by a factor 2 by decrementing the gain of amplifier 7 by 6 dB. Thus, the following relation holds:

$$\{(S_L)\times(2)+n\}\times(\tfrac{1}{2})=S_L+n/2$$

Thus, the CNR of the signal $S_L$ is equal to $2\times(S_L)/n$, and hence to $S_R/n$.

When the calculated average power of multiplexed amplitude data is two times as higher than the reference level and designated as $S_H$, the input of the D/A converter 6 is scaled down by a factor 2 by shifting the L-bit sequence by one bit upward with respect to the default positions. The output of the D/A converter 6 is scaled up by a factor 2 by incrementing the gain of amplifier 7 by 6 dB. Thus, the following relation holds:

$$\{(S_H)\times(\tfrac{1}{2})+n\}\times(2)=S_H+2n$$

Thus, the CNR of the signal $S_H$ is equal to $(S_H)/2n$, and hence to $S_R/n$.

It is seen that transmissions from a CDMA cell-site base station can be maintained at a substantially constant CNR value regardless of its transmission power levels. Another feature of the present invention is that since the average power of the multiplexed channel signals is compared with a reference power level in the control circuit 4, abnormal state of the signals can be detected. In such instances, the control circuit 4 controls the transmission power so that no interference can occur with other communication systems.

Figure 4:
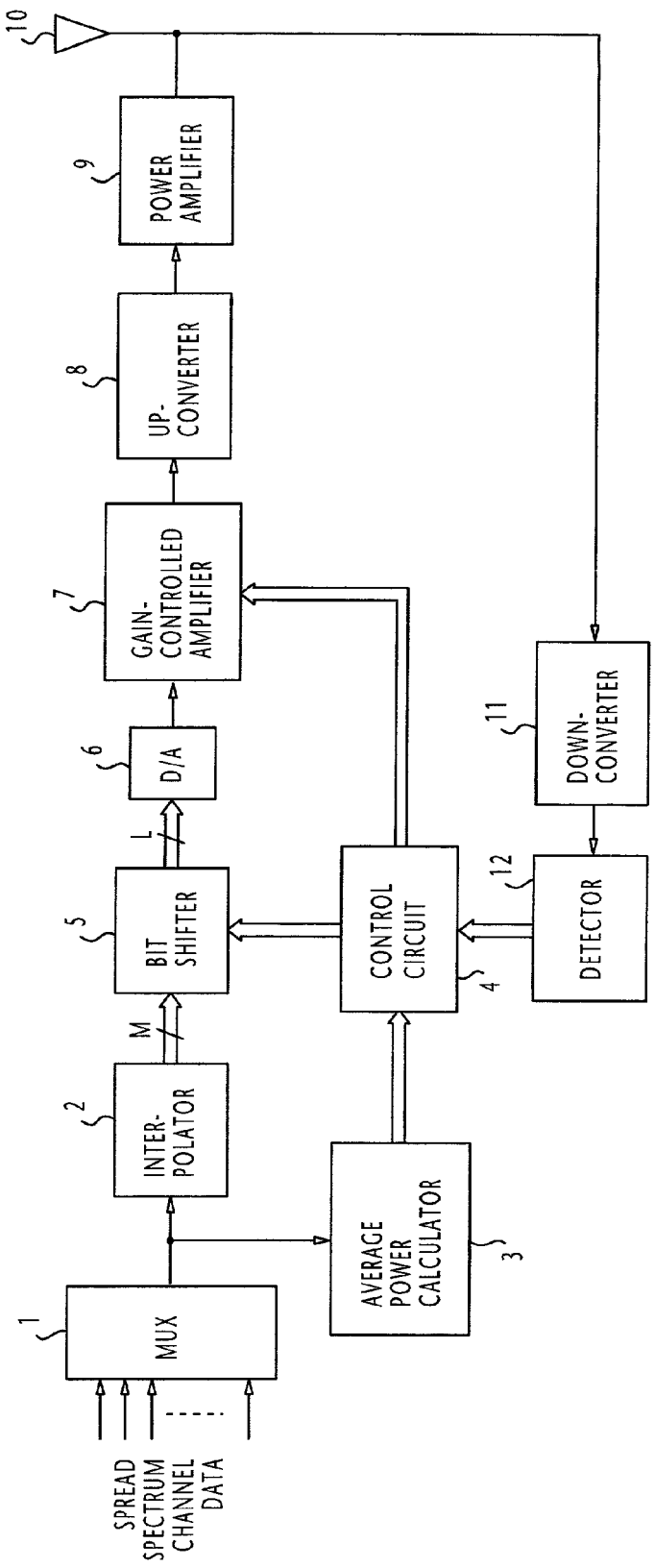
FIG. 4 is a block diagram of a CDMA transmitter according to a second embodiment of the present invention.

FIG. 4 shows a modified embodiment of the present invention in which a down-converter 11 and a detector 12 are connected to the output of power amplifier 9 for detecting the power level of the power amplifier 9. The output of detector 12 is used by the control circuit 8 to detect the difference between the calculated average power of the multiplexed digital amplitude data and the actual power level of the signal transmitted from the antenna 10.

Control circuit controls the bit shifter 5 according to the difference between the calculated average power and the reference power level in a manner as described above. Control circuit controls the gain of the amplifier 7 according to the difference between the calculated average power and the reference power level and the difference between the calculated average power and the actual power level of transmission. Thus, the gain of amplifier 7 is varied by an integral multiple of 6 dB according to the difference between the calculated average power and the reference power level in a manner as described above, plus a scale factor "α" which varies with the difference between the calculated average power and the actual transmission power level of the power amplifier 9. This feedback arrangement serves to prevent the power amplifier 9 from varying its transmission power which would otherwise by caused by environmental conditions.

Figure 5:
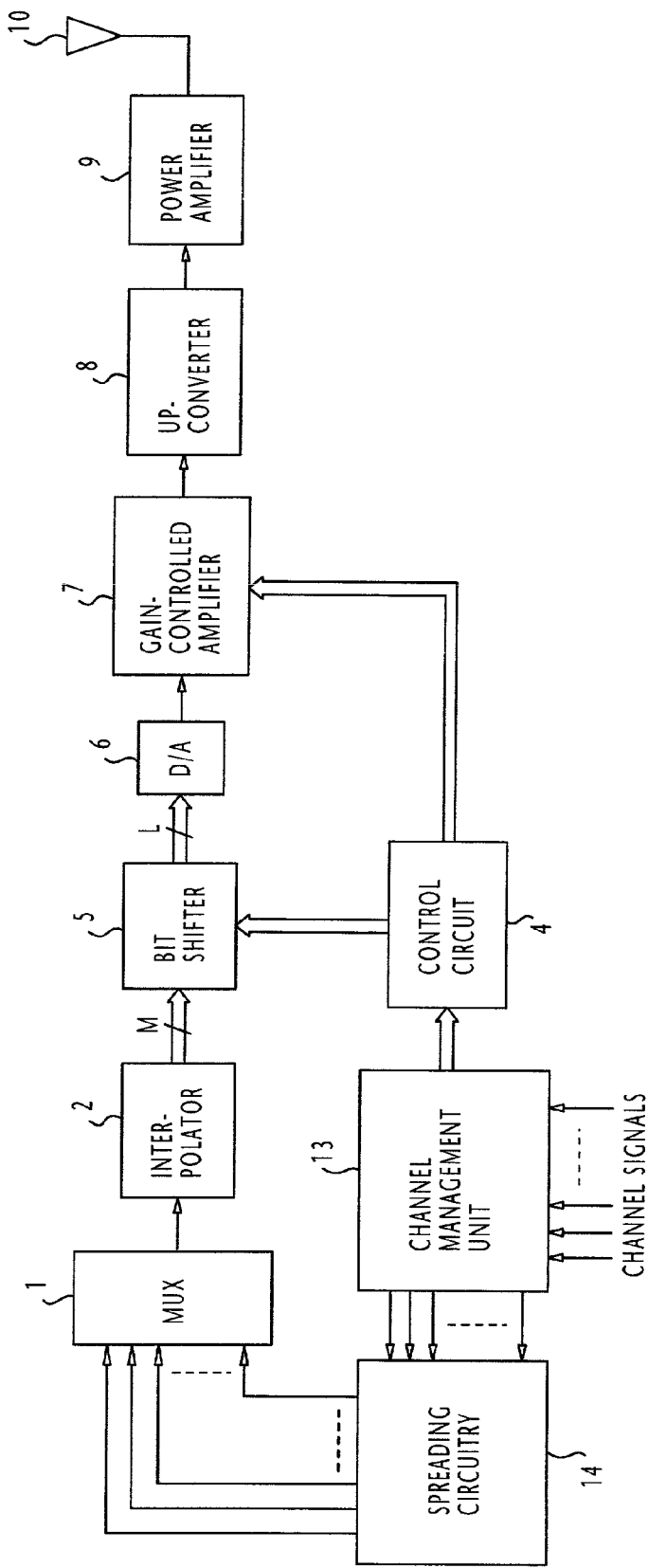
FIG. 5 is a block diagram of a CDMA transmitter according to a third embodiment of the present invention.

The average power of the multiplexed digital amplitude data can also be obtained by a channel management unit as shown in FIG. 5. Channel management unit 13 provides not only channel assignment and power control functions, but provides detection of the total average power of individual channel signals. Channel management unit 13 also determines spreading codes to be used by spreading circuitry 14 for scrambling the signals of assigned channels. The scrambled signals are supplied to the multiplexer 1 as the transmit spread spectrum signals mentioned above. The total average power of the transmit channel 11 signals is supplied from the channel management unit 13 to the control circuit 4, instead of the signal calculated by the average power calculator 3 of the previous embodiments.

What is claimed is:

1. A transmitter comprising:
   average power level calculation circuitry for determining the time-average power of a digital amplitude signal;
   conversion circuitry for scaling said digital amplitude signal according to a first scale factor, converting the scaled digital amplitude signal for transmission to an analog amplitude signal, and scaling the analog amplitude signal according to a second scale factor; and
   control circuitry for complementarily varying said first and second scale factors according to said time-average power.

2. A transmitter as claimed in claim 1, wherein said digital amplitude signal is a multiplexed digital amplitude signal in which a plurality of digital spread spectrum signals are multiplexed.

3. A transmitter as claimed in claim 1 or 2, wherein said conversion circuitry is configured to:
   compare the time-average power of said multiplexed digital amplitude signal with a reference power level and determine a differential power value; and
   determine said first and second scale factors according to said differential power value.

4. A transmitter as claimed in claim 1, wherein said conversion circuitry comprises:
   an interpolator for interpolating said digital amplitude signal and producing an output signal containing a greater number of bits than a number of bits contained in said digital amplitude signal;
   a bit shifter for selecting a predetermined number of bits from a plurality of bit positions of said output signal of the interpolator, said plurality of bit positions being determined by said first scale factor;
   a digital-to-analog converter for converting the output signal of the interpolator to an analog signal; and
   a gain-controlled amplifier for amplifying the analog signal from the digital-to-analog converter at a level determined by said second scale factor.

5. A transmitter as claimed in claim 1, further comprising:
   an up-converter for modulating said analog amplitude signal onto a carrier;
   a power amplifier for amplifying the modulated carrier; and detection circuitry for detecting power variation of said power amplifier,
   wherein said control circuitry is responsive to the detected power variation for controlling said second scale factor.

6. A transmitter as claimed in claim 1, wherein said average power level calculation circuitry is a channel management unit.

7. A spread spectrum transmitter comprising:
   a multiplexer for multiplexing a plurality of spread spectrum channel signals to produce a digital amplitude signal;
   average power level calculation circuitry for determining the time-average power of the digital amplitude signal; and
   conversion circuitry for scaling said digital amplitude signal according to a first scale factor, converting the scaled digital amplitude signal to an analog amplitude signal, scaling the analog amplitude signal according to a second scale factor; and
   control circuitry for complementarily varying said first and second scale factors according to said time-average power.

8. A spread spectrum transmitter as claimed in claim 7, wherein said conversion circuitry is configured to:
   compare the time-average power of said multiplexed digital amplitude signal with a reference power level and determine a differential power value; and
   determine said first and second scale factors according to said differential power value.

9. A spread spectrum transmitter as claimed in claim 7, wherein said conversion circuitry comprises:
   an interpolator for interpolating said digital amplitude signal and producing an output signal containing a greater number of bits than a number of bits contained in said digital amplitude signal;
   a bit shifter for selecting a predetermined number of bits from a plurality of bit positions of said output signal of the interpolator, said plurality of bit positions being determined by said first scale factor;
   a digital-to-analog converter for converting the output signal of the interpolator to an analog signal; and
   a gain-controlled amplifier for amplifying the analog signal from the digital-to-analog converter at a level determined by said second scale factor.

10. A spread spectrum transmitter as claimed in claim 7, further comprising:
    an up-converter for modulating said analog amplitude signal onto a carrier;
    a power amplifier for amplifying the modulated carrier; and detection circuitry for detecting power variation of said power amplifier,
    wherein said control circuitry is responsive to the detected power variation for controlling said second scale factor.

11. A transmitter as claimed in claim 7, wherein said average power level calculation circuitry is a channel management unit.

12. A communication method comprising the steps of:
    a) determining the time-average power of a digital amplitude signal;
    b) scaling said digital amplitude signal according to said time-average power;
    c) converting the scaled digital amplitude signal to an analog amplitude signal;
    d) scaling the analog amplitude signal according to said time-average power complementarily to the step (b); and e) transmitting the scaled analog amplitude signal.

13. A communication method as claimed in claim 12, wherein the step (b) comprises the steps of:

interpolating said digital amplitude signal and producing an output signal containing a greater number of bits than a number of bits contained in said digital amplitude signal;

selecting a predetermined number of bits from a plurality of bit positions of said output signal according to said time-average power;

converting the scaled digital amplitude signal to an analog amplitude signal; and amplifying the analog amplitude signal according to said timeaverage power.

14. A communication method as claimed in claim 12, further comprising:

modulating said analog amplitude signal onto a carrier; amplifying the modulated carrier;

detecting power variation of the modulated carrier; controlling amplification gain of said analog amplitude signals according to the detected power variation.

15. A communication method comprising the steps of:

a) determining the time-average power of a digital amplitude signal;

b) comparing the determined time-average power with a reference power level and determining a differential power value;

c) scaling said digital amplitude signal according to said differential power value;

d) converting the scaled digital amplitude signal to an analog amplitude signal;

e) scaling the analog amplitude signal according to said differential power value complementarily to the step (c); and f) transmitting the scaled analog amplitude signal.

16. A communication method as claimed in claim 15, wherein the step (c) comprises the steps of:

interpolating said digital amplitude signal and producing an output signal containing a greater number of bits than a number of bits contained in said digital amplitude signal;

selecting a predetermined number of bits from a plurality of bit positions of said output signal according to said differential power value;

converting the scaled digital amplitude signal to an analog amplitude signal; and amplifying the analog amplitude signal according to said differential power value.

17. A communication method as claimed in claim 15, further comprising:

modulating said analog amplitude signal onto a carrier; amplifying the modulated carrier;

detecting power variation of the modulated carrier; and controlling amplification gain of said analog amplitude signals according to the detected power variation.

* * * * *